INDEX POINTER FOR RECORDING AND MOVIE REELS

Filed July 31, 1959 3 Sheets-Sheet 1

INVENTORS
George M. Bradley
Juan Supero

INVENTORS
George M. Bradley
Juan Supero

INDEX POINTER FOR RECORDING AND MOVIE REELS

Filed July 31, 1959 3 Sheets-Sheet 3

INVENTORS
George M. Bradley
Juan Supero

United States Patent Office 3,006,312

Patented Oct. 31, 1961

3,006,312

INDEX POINTER FOR RECORDING AND MOVIE REELS

George M. Bradley, 605 Oklahoma Ave., Lincoln, Ill., and Juan Supero, Menard, Ill. (% Mrs. Gertrude Rentshler, 605 Oklahoma Ave., Lincoln, Ill.)

Filed July 31, 1959, Ser. No. 836,842
2 Claims. (Cl. 116—114)

This invention relates to an index pointer for recording and movie reels.

It is the principal object of the present invention to provide an accurate index pointer for recording and movie reels in which on a single reel many different recordings exist whereby to free the operator of the need to remember where certain programs are located on the reel.

It is another object of the invention to provide an index pointer for recording and movie reels which forms a part of the reel and over which a transparent cover can be placed to protect the tape and index pointers whereby the reel having this index pointer may be stored away conveniently free from harm and dust.

It is another object of the invention to provide with an index pointer for recording and movie reels a color arrangement to further distinguish the selections from one another.

Other objects of the invention are to provide an index pointer mechanism for recording and movie reels, having the above objects in mind, which is of simple construction, has a minimum number of parts, inexpensive to manufacture, compact, light in weight, of pleasing appearance, effective and efficient in use.

Figure 1:
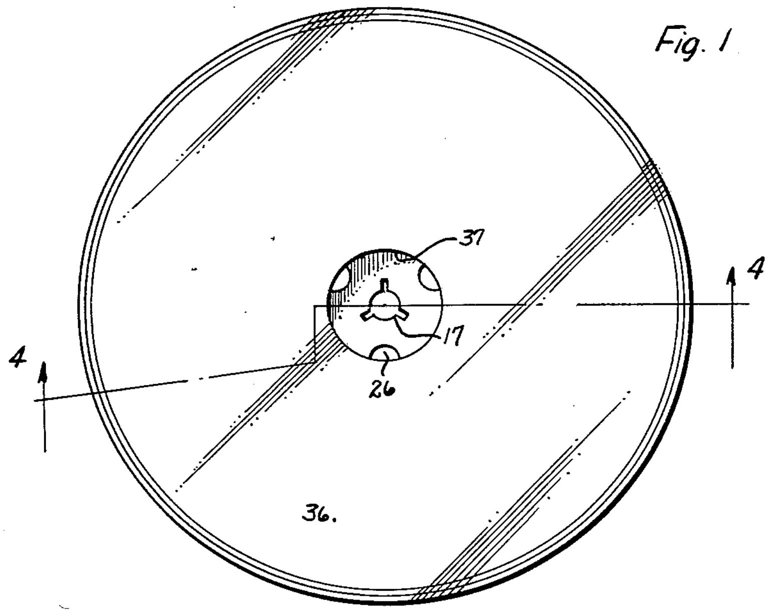
Figures 2, 5:
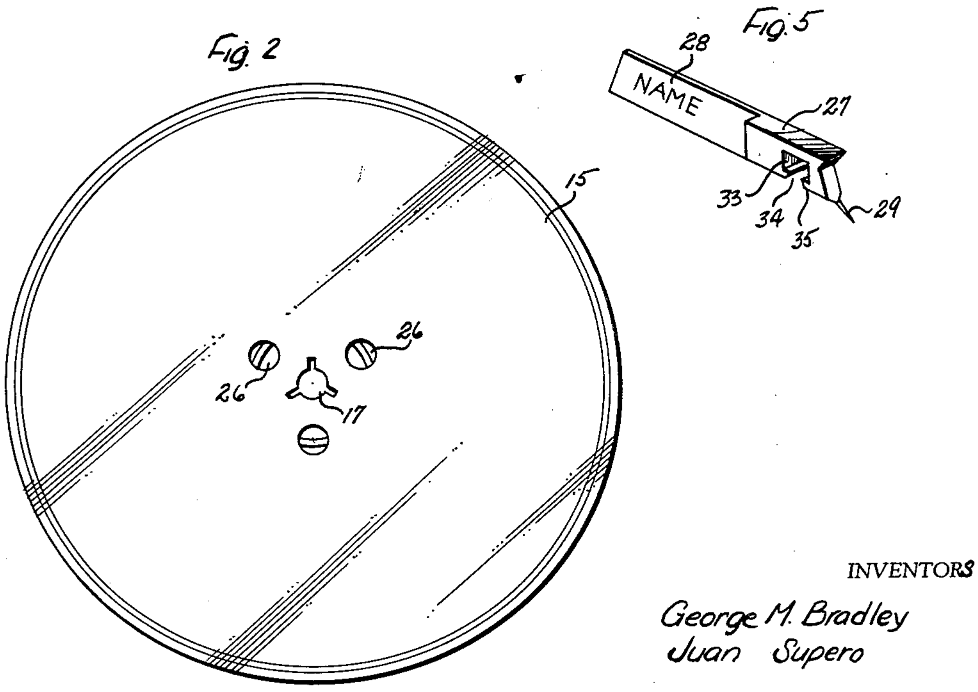
Figure 3:
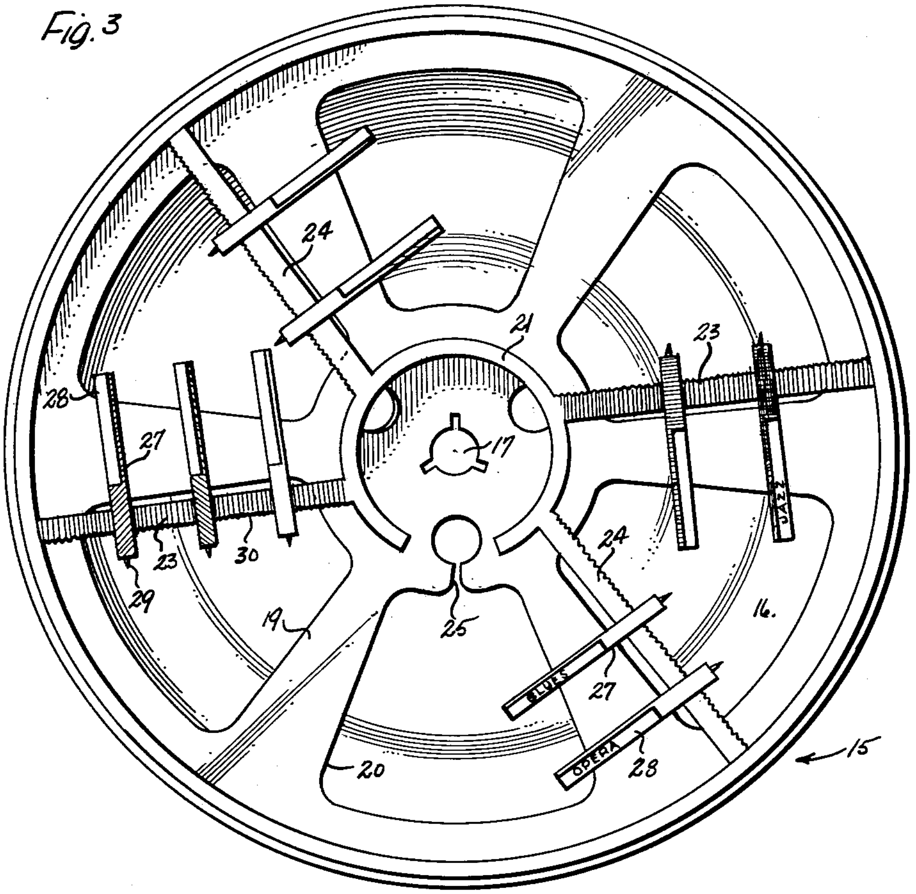
Figure 4:
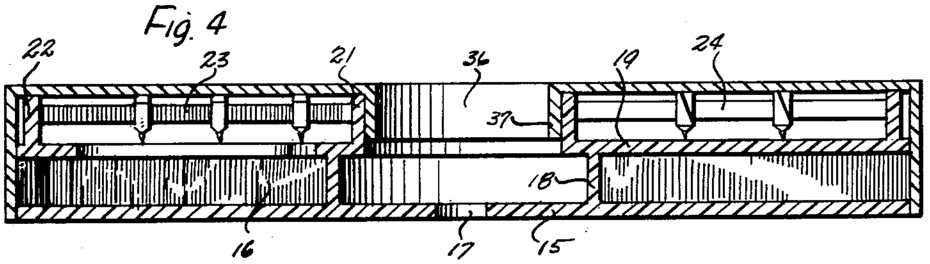
Figure 6:
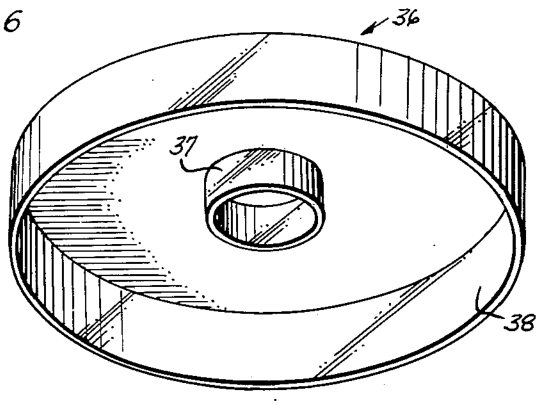
Figure 7:
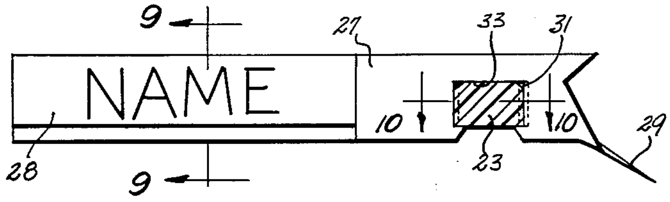
Figure 9:
Figure 8:
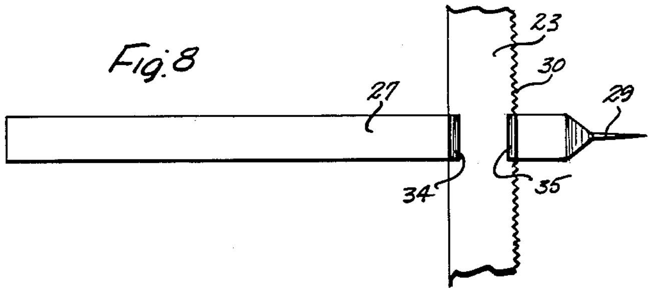
Figure 10:
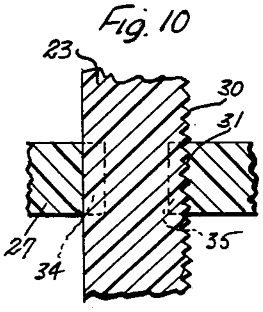
Figure 11:
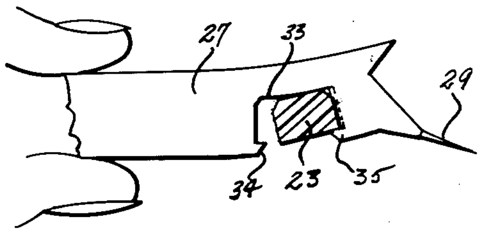

For a better understanding of the invention, reference may be had to the following detailed description taken in connection with the accompanying drawing, in which FIGURE 1 is a top plan view of a reel with the cover thereover, FIG. 2 is a bottom plan view of the reel, FIG. 3 is an enlarged plan view of the reel with the cover removed and looking upon the index pointer mechanism of the present invention associated therewith, FIG. 4 is an enlarged transverse vertical sectional view taken on line 4—4 of FIG. 1, FIG. 5 is a perspective view of one of the index pointers, FIG. 6 is a bottom perspective view of the cover, FIG. 7 is a side elevational view of the index pointer and of the bar on which it is mounted being in section, FIG. 8 is a top plan view of the index pointer and a fragment of its bar, FIG. 9 is a sectional view taken on line 9—9 of FIG. 7, FIG. 10 is a transverse sectional view taken on line 10—10 of FIG. 7, and FIG. 11 is a side elevational view illustrating the manner in which the index pointer is attached to its support bar.

Referring now to the drawings, 15 represents a film reel adapted to contain film 16. This reel has a center pin hole 17 and a center hub 18 and a spider top portion 19 with opening 20 therein extending about the hub. Extending upwardly from the top portion 19 is a central circular rib 21 and an outer rib 22 concentric therewith and lying along the periphery of the spider portion 19. Extending between the central portion 21 and the outer rib portion 22 are four index pointer supporting bars 23 and 24. The index supporting bars 23 are colored for reasons to be set forth thereafter whereas the bars 24 are left transparent. The tape 16 is secured to the reel through a slot 25 in the hub portion 18.

The reel 15 has auxiliary holes 26 surrounding the center holes 17, FIG. 2. Index pointers 27 are assembled in transverse relation with respect to and upon the bars 20 and 24 to indicate the location upon the reel film where a certain program or picture starts. The name of the program can be inscribed along an inclined flat portion as indicated at 28. Each index pointer has a fine needle projecting from one end thereof as indicated at 29 to indicate varying minutely the program location upon the film 16. The pointers 28 are positioned upon the bars 23 and 24 so that the pointers 29 overlie the openings 20 in the spider portion 19. On one side of the bars 23 and 24 are vertically-extending serrations 30. Similar grooves 31 are provided on the inner side of a notch 33 in the pointer 27 to cooperate with the serrations 30 on the bar 23 or 24 so as to hold the pointer in its adjusted position upon the bar 23 or 24. The pointers 29 while depending into close proximity to the edge of the film are not allowed to be close enough to touch the film tape. By grasping the pointer 27 in the manner as shown in FIG. 11 the pointer can flex sufficiently over the bar 23 or 24 so that it can be worked into the notch 33. Opposing projections 34 and 35 retain the pointer 27 against upwardly displacement upon the bar 23 or 24. The serrations on the bar 23 or 24 and on the pointer serve to prevent the pointer from sliding along the bar and insures the accuracy of the pointer.

A cover 36 is adapted to fit over the reel 15 and has a central sleeve portion 37 providing an open center adapted to fit inside of the central projections 21 of the reel 17. This cover also has a peripheral flange 38 that extends across the full width of the reel so as to totally enclose the reel, the film and the indicator mechanism. Through the sleeve 37 providing an opening in the cover, the cover can be removed by pushing downwardly through the opening with the thumb while the fingers lie under the bottom of the reel.

The index pointer 27 bearing the names of programs, such as speech, politics, games, baby talk, education, music, etc. are inscribed by the operator by the pointer, all of which can be read through the cover which may be made of transparent plastic, without need for removing the cover to identify the program. When the program has served its purpose the operator may erase and record another program of the same length thereon. The index pointer 27 is removed from the bar and the name of the program on the surface 28 is changed and the bar may be returned to its former position and the operator continue to record his desired program.

The bars 23 may be colored to identify one edge of the tape and the other two bars 24 of clear plastic are used to identify the other edge of the tape. The pointers may also have a color identifying the type and nature of the program.

It should now be apparent that there has been provided a simple mechanism for keeping the programs on a film identified as to exact location thereof.

While various changes may be made in the detailed construction, it shall be understood that such changes shall be within the spirit and scope of the present invention as defined by the appended claims.

What is claimed is:

1. In a film reel assembly, including a hub provider with a center pin hole, and a spider top portion extending about the hub, said top portion being provided with a plurality of openings arranged in spaced relation therearound, an index pointer supporting bar adjacent each opening and extending radially outwardly from said hub, an index pointer arranged transversely of and adjustably mounted on each of said bars, each pointer having a needle at one end thereof and being disposed so that the needle overlies the adjacent opening in said spider top portion, each of said pointers being provided with an inclined flat portion adjacent the other end thereof, said flat portions being provided with identifying indicia.

2. The apparatus as set forth in claim 1 together with spaced serrations extending along each of said bars and opposed projections on each of said pointers engageable in said serrations.

References Cited in the file of this patent

UNITED STATES PATENTS

| | | |
|---|---|---|
| 2,422,032 | Mihalyi | June 10, 1947 |
| 2,511,708 | Hammond | June 13, 1950 |
| 2,829,618 | Ostergard | Apr. 8, 1958 |

FOREIGN PATENTS

| | | |
|---|---|---|
| 794,874 | Great Britain | May 14, 1958 |